(12) United States Patent
Matsumoto

(10) Patent No.: US 7,196,813 B2
(45) Date of Patent: Mar. 27, 2007

(54) METHOD OF MAKING PRINTED MATTER AND THE PRINTED MATTER

(75) Inventor: Keizaburo Matsumoto, Fukuoka-ken (JP)

(73) Assignee: Matsumoto Inc., Fukuoka-Ken (JP)

( * ) Notice: Subject to any disclaimer, the term of this patent is extended or adjusted under 35 U.S.C. 154(b) by 1018 days.

(21) Appl. No.: 09/734,767

(22) Filed: Dec. 13, 2000

(65) Prior Publication Data

US 2002/0063897 A1 May 30, 2002

(30) Foreign Application Priority Data

Nov. 28, 2000 (JP) ............................. 2000-361841

(51) Int. Cl.
G06F 15/00 (2006.01)
G06K 1/00 (2006.01)
G06K 15/22 (2006.01)

(52) U.S. Cl. ...................... 358/1.3; 358/1.9; 358/1.15; 358/1.16; 707/517; 707/520; 707/539; 283/56; 283/46; 347/4

(58) Field of Classification Search ................ 358/1.3, 358/1.9, 1.15, 1.16; 707/517, 520, 539; 283/56, 46; 347/4
See application file for complete search history.

(56) References Cited

U.S. PATENT DOCUMENTS

| | | | | |
|---|---|---|---|---|
| 3,692,298 A | * | 9/1972 | Peacock | 270/12 |
| 4,817,310 A | * | 4/1989 | Breen et al. | 40/6 |
| 5,170,467 A | * | 12/1992 | Kubota et al. | 715/520 |
| 5,214,755 A | * | 5/1993 | Mason | 715/520 |
| 5,563,956 A | * | 10/1996 | Nishikawa et al. | 382/118 |
| 5,718,521 A | * | 2/1998 | Koo | 400/120.02 |
| 5,742,879 A | * | 4/1998 | Altrieth, III | 399/139 |
| 5,845,302 A | * | 12/1998 | Cyman et al. | 715/517 |
| 5,980,011 A | * | 11/1999 | Cummins et al. | 347/4 |
| 5,992,889 A | * | 11/1999 | Barnett et al. | 283/56 |
| 6,095,566 A | * | 8/2000 | Yamamoto et al. | 283/75 |
| 6,134,018 A | * | 10/2000 | Dziesietnik et al. | 358/1.15 |
| 6,243,172 B1 | * | 6/2001 | Gauthier et al. | 358/1.18 |

(Continued)

FOREIGN PATENT DOCUMENTS

EP 0 384 274 A2 8/1990

(Continued)

Primary Examiner—David Moore
Assistant Examiner—Michael Burleson
(74) Attorney, Agent, or Firm—Sughrue Mion, PLLC

(57) ABSTRACT

The present invention provides a print creating method which can instantaneously create media such as advertisements which are agreeable to the customer by incorporating therein customer snapshots, etc. by the process of printing with an ink-jet recording system on a coating layer of ink-jet recording ink on a variable region of a recording sheet on which constant information such as advertisements or scenery is printed by offset printing or the like, and which can thus notably enhance the memorial advertisement effect. The print creating method of the invention comprises an imaging step in which a target is imaged and digital image data of the target is created, a conversion step in which the digital image data is converted to print data, and a printing step in which the print data is printed with an ink-jet recording system as variable information on the variable region of a recording sheet comprising a constant region in which prescribed constant information is to be printed and a variable region in which variable information is to be printed.

15 Claims, 5 Drawing Sheets

U.S. PATENT DOCUMENTS

| | | | |
|---|---|---|---|
| 6,264,296 B1 * | 7/2001 | Klinefelter et al. | 347/4 |
| 6,276,724 B1 * | 8/2001 | Zorn | 283/56 |
| 6,353,772 B1 * | 3/2002 | Silverbrook | 700/233 |
| 6,404,994 B1 * | 6/2002 | Kawai et al. | 399/6 |
| 6,446,100 B1 * | 9/2002 | Warmus et al. | 715/517 |
| 6,533,324 B2 * | 3/2003 | Zorn | 283/56 |
| 6,665,587 B2 * | 12/2003 | Leone et al. | 700/235 |
| 6,732,152 B2 * | 5/2004 | Lockhart et al. | 709/206 |
| 6,769,018 B2 * | 7/2004 | Gagnon | 709/218 |

FOREIGN PATENT DOCUMENTS

| | | |
|---|---|---|
| EP | 0 384 274 A3 | 8/1990 |
| EP | 0665124 A1 * | 12/1994 |
| EP | 0 665 124 A1 | 8/1995 |
| EP | 1 300 256 A1 | 4/2003 |
| GB | 2 342 638 A | 4/2000 |
| JP | 58-38150 | 3/1983 |
| JP | 4-179591 A | 6/1992 |
| JP | 6-15382 | 2/1994 |
| JP | 8-106539 | 4/1996 |
| JP | 08-156340 A | 6/1996 |
| JP | 3048510 | 2/1998 |
| JP | 10-137441 A | 5/1998 |
| JP | 11-279502 A | 10/1999 |
| JP | 2000-247016 A | 9/2000 |
| WO | WO 97/01796 A1 | 1/1997 |
| WO | WO 01/87633 A1 | 11/2001 |

* cited by examiner (a)

(b)

(a)

(b)

(a)

(b)

METHOD OF MAKING PRINTED MATTER AND THE PRINTED MATTER

BACKGROUND OF THE INVENTION

1. Field of the Invention

The present invention relates to a print creating method which accomplishes printing of constant information such as an advertisement and variable information such as a personal photograph or daily special products, as well as to prints on which such constant information and variable information are printed.

2. Description of the Prior Arts

Various types of prints have been created in the past as advertisement leaflets for hotels or sales shops, or for amusement park admission tickets or the like.

In addition, the downsizing and higher performance of photographic devices and printers in recent years has spurred research and development on various prints and creating methods therefor.

One conventional technique disclosed in Japanese Unexamined Utility Model Publication No. 15382 of 1994 (hereunder referred to as "Publication A") is "A portrait card creating apparatus comprising an electronic image file containing different prerecorded images in a photographic apparatus provided with a photographic device, image extraction means for extraction of multiple images from the electronic image file, display means for display of imaged target images on a monitor portion, and image processing means that accomplishes framing, etc. for editing of the target images, which is provided with image processing means that displays a desired image from said electronic image file onto a monitor portion, integrates it with a target image imaged by the photographic device and replaces a portion of the image displayed on said monitor portion with the target image to create a composite photograph, and a printing device that prints the composite photograph."

In addition, Japanese Unexamined Patent Publication No. 106539 of 1996 (hereunder referred to as "Publication B") discloses "An image printing method for meetings, comprising a first imaging step in which an image common to all of the attendants at a meeting is imaged at the meeting, a second imaging step in which an image for an individual attendant at the meeting is imaged at the meeting, an inputting step in which the common image and individual image are inputted into an image processing apparatus, an editing step in which the common image and individual image inputted to the image processing apparatus are edited and character information relating to the meeting is added, and a printing step in which multiple copies of an image based on the edited information are printed up to the conclusion of the meeting."

Japanese Registered Utility Model Publication No. 3048510 (hereunder referred to as "Publication C") discloses "A composite image picture postcard printing apparatus provided with image processing means which, upon detecting insertion of an appropriate fee, reads out a plurality of scenery images from an image memory and displays them on the display screen of an operating/display mechanism; photographic control means which activates an imaging mechanism in response to touch panel operation by a user at a position corresponding to a photograph-indicating operating button displayed on the display screen of the display mechanism, to photograph the face of the user; image composing means which prepares a composite of a scenery image selected by the user from among the plurality of scenery images displayed on the display screen, by touching the operating panel, and an image of the face of the user imaged by the imaging mechanism; and a printing mechanism which prints the composed image on postcard-size paper and outputs it."

Moreover, Japanese Unexamined Utility Model Publication No. 38150 of 1983 (hereunder referred to as "Publication D") discloses "Camera film prepared by continuous printing of advertisement information on the lower edge or upper edge of film."

SUMMARY OF THE INVENTION

These prior art techniques, however, have been associated with the following problems.

(1) Conventional advertisement leaflets contain only constant information, and if the product in a leaflet is of no interest, the leaflet is almost always discarded immediately, such that the advertisement effect is reduced and resources are wasted.

(2) Because conventional admission tickets for amusement parks and the like do not contain prints of the purchaser's facial photograph, it has been difficult to identify the bearer.

(3) In the technique described in Publication A, the imaged target image of the user and various other images are composed and processed by image processing means and then printed on the entirety of a portrait card, and therefore the printing area is large after imaging of the image, and more time is required for output of the print.

(4) In the technique described in Publication B, the photograph of the images common to all of the attendants and the images of the individual attendants are printed together on the entirety of a printing sheet, and therefore the printing area is large after imaging of the images and more time is required for output of the print.

(5) In the technique described in Publication B, the operation for imaging of the images common to all of the attendants and the images of the individual attendants and for their editing must be carried out during the meeting, and this requires time and a complicated procedure.

(6) In the technique described in Publication B, it is necessary to edit at least two images and this requires a high performance computer and is not adaptable for general use.

(7) In the technique described in Publication C, the imaged facial image of the user and the scenery image are composed and processed by image composing means, and are printed on the entirety of a postcard. Therefore, the printing area is large after imaging of the images and more time is required for output of the print.

(8) In the techniques described in Publications A and C, the images must be always composed and this requires a high performance computer.

(9) In the techniques described in Publications A and C, it is necessary to prerecord various images and this increases the volume of data in the memory.

(10) In the techniques described in Publications A, B and C, no advertisement information is printed and therefore the advertisement effect is minimal.

(11) In the technique described in Publication D, it is necessary to print character information on the film and therefore the film production step is more complicated.

(12) In the technique described in Publication D, only character information is printed as the advertisement information and therefore it is less attractive than a graphic and the advertisement effect is thereby reduced.

(13) In the technique described in Publication D, the advertisement information sometimes covers the photograph and this can ruin pictures that are important to users.

(14) In the technique described in Publication D, it requires to develop the photograph and therefore the photograph cannot be immediately obtained.

The present invention overcomes these problems of the prior art by providing a print creating method which can instantaneously create media such as advertisements which are agreeable to the customer by incorporating therein customer snapshots, etc. by the process of printing with an ink-jet recording system on a coating layer of ink-jet recording ink on a variable region formed on a prescribed area of a recording sheet on which constant information such as advertisements, scenery and ticket information is printed by offset printing or the like, and which can thus notably enhance the memorial advertisement effect, as well as providing prints that can be retained for long periods by customers as memorial prints and are therefore highly effective as advertisement materials.

The print creating method of the invention and prints obtained by the method have the following construction.

The print creating method according to the invention is a method of creating prints on which variable information and constant information are printed, which has a construction characterized by comprising a. a imaging step in which a target is imaged and digital image data of the target is created, b. a conversion step in which the digital image data is converted to print-processable print data and c. a printing step in which the print data is printed with an ink-jet recording system as variable information on the variable region of a recording sheet comprising a constant region in which prescribed constant information is to be printed and a variable region in which variable information is to be printed.

This construction exhibits the following effects.

(1) Since personal photographs or daily special products (variable information) can be imaged by a imaging step onto a recording sheet on which an advertisement or scenery and characters (constant information) has been already printed, it is possible to create memorial prints depending on the time, place and occasion.

(2) Since the advertisement or scenery and characters (constant information) are already printed and a imaged image is simply printed on the variable region after the target is imaged, it is possible to shorten the time from imaging a target to output of the print, to create prints more rapidly than by printing with conventional ink-jet recording systems onto an entire recording sheet, and to control the amount of ink-jet recording ink used, so that greater productivity is achieved.

(3) Since printing means based on an ink-jet recording system is used, it is possible to rapidly create prints with superior designs at low cost.

(4) Since the constant information is already printed on the recording sheet, no memory portion is required to store the constant information and there is no need to compose the constant information and variable information, so that no high performance computer is necessary and the procedure can be carried out using an apparatus with a simpler construction than by conventional techniques.

(5) By printing advertisement information as constant information and advertisement information for different sales shops selling the products printed in the constant information as variable information, it is possible to put advertisements for a plurality of sales shops in a chain to be shown together on a single print. Therefore, greater function as an advertising strategy, coordination of prints and reduction of advertisement costs can be achieved.

(6) By printing a plurality of targets as constant information and printing personal information as variable information (for example, if the print is to be created by a hotel, by printing photographs of the hotel, famous tourist sites available to guests or the characters for famous tourist sites as constant information and printing family photographs of hotel guests as variable information), it is possible to provide original memorial prints that can evoke a number of memories from a single print.

One or more variable regions can be provided, and they can be provided on any area of the recording sheet, etc.

The shape of the variable region can be appropriately selected from among any shapes including triangle, star shapes, cloud shapes, circles, oval shapes and the like.

The constant information is printed by a lithographic printing method such as offset printing, by an intaglio printing method such as gravure printing, or by a relief printing method.

The ink used to print the constant information can be ordinary oil-based ink, solvent-based ink or water-based ink.

The printing pattern for the constant information can be a so-called "draft print" whereby the sections for the image to be printed by the ink-jet recording system (the variable information) are not printed.

The print creating method is used at restaurants, hotels, wedding halls, tourist sites, department stores, supermarkets, automobile dealers, sales promotion exhibitions, and the like. When used at hotels or wedding halls, the service information and building images are printed as the constant information, when used at tourist sites, the tourist location images are printed as the constant information, and when used at department stores, supermarkets, restaurants, automobile dealers or sales promotion exhibitions, the product images are printed as the constant information.

When used at department stores, supermarkets or automobile dealers, images of daily special products can be printed as variable information. This eliminates the need to print onto an entire printing sheet each day, and since only the variable information need be printed it is possible to create advertisement leaflets at lower cost and thereby improve productivity.

Certificates can be also printed as constant information, and images of prize people or works of art can be printed as variable information.

Character information such as dates and names can be also added to the variable information during the conversion step.

The imaging means used for the imaging step can be a digital camera or digital video camera, the conversion means used for the conversion step can be a personal computer, and the printing means used for the printing step can be an ink-jet printer or the like; however, any two or all of the imaging means, conversion means and printing means can be also integrated into a single apparatus.

Another aspect of the invention is a print creating method characterized in that the constant information of the recording sheet is printed by more than any one of a lithographic printing method such as offset printing, an intaglio printing method such as gravure printing or by a relief printing method.

This construction exhibits the following effects.

(1) It is possible to create prints bearing clearly printed constant information.

(2) Since the recording sheet can be mass produced at low cost, it is possible to minimize costs for the prints and thus improve productivity.

Another aspect of the invention is a print creating method characterized in that there is provided a coating layer on which ink-jet recording ink for printing of the variable information on at least the variable region of the recording sheet is to be printed.

This construction exhibits the following effects.

(1) There is virtually no running or dulling of the ink-jet recording ink, so that prints can be created bearing clear images that last for long periods.

The coating layer can be formed only on the variable region, or it can be formed over the entire surface of the printing sheet. When formed only on the variable region, it is possible to reduce the amount of coating agent used, thus allowing production at lower cost and allowing reliable printing of ink-jet recording ink.

As coating agents to be used to form the coating layer there can be mentioned coating agents obtained by dissolving and decomposing in an appropriate solvent one or more binder resins selected from among binder resins that are wettable with respect to water, including proteins such as casein and synthetic proteins, starches such as oxidized starch and esterified starch, celluloses, polyvinyl alcohol and the like; binder resins with excellent dye fixing properties that are used as ink-jet recording ink coloring agents, such as quaternary ammonium salts of cation-modified polyvinyl alcohols or anion-modified polyvinyl alcohols, polyacrylamide, polyalkylacrylamides and the like; as well as highly adhesive binder resins such as acryl resins, polyurethane resins, polyester resins, etc., and dispersing therein one or more layered or sheet-like inorganic pigments or plastic pigments, preferably porous, such as silica, alumina sol, barium sulfate, calcium carbonate, clay or talc, and further containing various additives if necessary.

The coating layer can be a single layer, or it can be formed by two or more combined layers. It can be formed over the entire surface of the printing sheet, or only over parts thereof. When the coating layer is formed overlapping the constant information, on either the entire print or a portion thereof, it is preferred for the formed coating layer to be as highly transparent as possible so that the advertisement information is not hidden. It is also preferred to form the coating layer with a coating agent that does not dissolve the ink, so that the printing ink for the constant information does not run or bleed. When the coating layer is formed only on the sections where the constant information is not printed, the coating layer can be either transparent or non-transparent.

The method of forming the coating layer can employ any of various coating machines such roll coaters, gravure coaters, flexo coaters, blade coaters, rod coaters and air knife coaters, as well as printing units of lithographic printers, relief printers and intaglio printers, while roll coaters, gravure coaters, flexo coaters and printing units of lithographic printers, relief printers and intaglio printers can be also used to partially form the coating layer. When the coating machine of a flexo system provided with an anilox roll and rubber roll can be advantageously used as it allows easy formation of coating layers to a high film thickness, for example, a film thickness of 5–20 μm.

Using a coating agent that allows formation of a smooth coating layer on the printing surface particularly when the printing ink of the constant information has not fully dried, it is advantageous from the standpoint of accomplishing the constant information printing and coating layer formation in a series of steps (in-line system). The coating agents used for such coating layers are preferably types that contain high concentrations of inorganic pigments or plastic pigments to an extent that still maintains the required transparency and coating compatibility. The method of forming the coating layer with an in-line system can be a method using a printer back unit or a method linking a printer and coating machine newly. The coating layer can be also formed using a printer or coating machine in a different step from the constant information printing (off-line system).

Another aspect of the invention is a print creating method characterized in that the coating layer is formed after forming the constant region on which the constant information is printed on the recording sheet, and either including or not including the constant region.

This construction exhibits the following effect.

(1) When the constant region and variable region overlap, i.e. when the variable information is printed over the constant information, the coating layer lies between the constant information and variable information and hence there is no contact between the printing ink of the constant information and the ink-jet recording ink of the variable information, so that repelling or discoloration cannot easily occur even with combinations of different types of inks such as oil-based printing ink and water-based ink-jet recording ink.

Another aspect of the invention is a print creating method characterized in that a. in the imaging step, the imaging means that images the target to create the digital image data of the target is a digital camera, b. in the conversion step, the conversion means that converts the digital image data to the print-processable print data is a personal computer, and c. in the printing step, the printing means that prints the print data with an ink-jet recording system as variable information on the variable region of the recording sheet comprising the constant region in which prescribed constant information is to be printed and the variable region in which the variable information is to be printed, is an ink-jet recording system printer.

This construction exhibits the following effects.

(1) Since the target can be imaged with only a digital camera without connecting the digital camera to another device, it is possible to photograph from any desired position or angle depending on the state and position of the target.

(2) Since the digital image data can be read into a personal computer and the digital image data processed with application software such as PhotoShop™ (Adobe Systems), it is possible to compose an image and adjust the brightness and contrast of the composite image and thus output the desired variable information.

(3) Since an ink-jet recording system printer. is used, it is possible to create prints with excellent designs on the spot.

(4) Since the digital camera, personal computer and printer can be detached from each other in a simple manner, the maintenance is facilitated.

Another aspect of the invention is a print creating method characterized in that the constant information is advertisement information, and the variable information is personal information of a person who is to receive the print.

This construction exhibits the following effects.

(1) Since the advertisement information and personal information are printed on the same print, it is less likely to be discarded than advertisement leaflets on which only advertisement information is printed, and it can be even used as decoration on the wall of a private room or the like, so that a longer, more reliable advertisement effect is obtained.

(2) For example, for printing of advertisements for supermarkets, department stores, restaurants, inns, hotels or the like as advertisement information and a personal photograph of who is provided with the print as personal information, there is a greater possibility of preserving for long periods and of repeated viewing compared to prints on which only product images are printed, so that a longer, more reliable advertisement effect can be obtained.

(3) It is possible to take the image of customers (guests) at supermarkets, department stores, restaurants, inns, hotels or the like on location and print a photograph of the customer (guest) on a print on which advertisement information is printed, to provide a print with the photograph of the customer (guest) printed in a reliable manner.

When the print creating method is to be used at hotels or wedding halls, the service information and building photographs are printed as the advertisement information, when used at tourist sites the tourist location photographs are printed as the advertisement information, and when used at department stores or supermarkets, the product images are used as the advertisement information.

The personal information which is printed is information relating to the person who is to receive the print, such as a photograph of the person receiving the print, a family portrait or the like.

The advertisement information can be advertisements for one or more hotel facilities or retailing outlets.

Another aspect of the is a print creating method characterized in that the variable information is an official photograph such as a facial photograph of a person who is to receive the print.

This construction exhibits the following effect.

(1) Since the face photograph of the individual is printed on the print, the print can be used as a deposit passbook or insurance policy certificate for which personal identification is important.

Another aspect of the invention is characterized by comprising a. a printing sheet, b. constant information printed on the printing sheet by offset printing or the like, c. a coating layer which is coated on the printing sheet and on which ink-jet recording is printed, and d. variable information printed on the coating layer by a print creating method as described previously.

(1) Since advertisement information (constant information) and personal information (variable information) are printed on the same print, it is less likely to be discarded than advertisement leaflets on which only advertisement information is printed, and it can be even used as decoration on the wall of a private room or the like, so that a longer, more reliable advertisement effect is obtained.

(2) For example, for printing of advertisements for supermarkets, department stores, restaurants, inns, hotels or the like as the constant information and a personal photograph of who is provided with the print as the variable information, there is a greater possibility of preserving for long periods and of repeated viewing compared to prints on which only product images are printed, so that a longer, more reliable advertisement effect can be obtained.

(3) By printing advertisement information as constant information and printing advertisement information for different sales shops selling the products printed in the constant information as variable information, it is possible to put advertisements for a plurality of sales shops in a chain to be shown together on a single print, for greater function as an advertising strategy, for coordination of prints, and for reduction of advertisement costs.

(4) By printing a plurality of targets as constant information and printing personal information as variable information (for example, if the print is to be created by a hotel, by printing photographs of the hotel, famous tourist sites available to guests or characters of famous tourist sites as constant information and printing family photographs of hotel guests as variable information), it is possible to provide original memorial prints that can evoke a number of memories from a single print.

The printing sheet used here is art paper, coated paper, cast coated paper, glossy paper, high quality paper, medium quality paper, etc.

The constant information is printed by a lithographic printing method such as offset printing, by an intaglio printing method such as gravure printing, or by a relief printing method.

The printing ink used to print the constant information is ordinary oil-based ink, solvent-based ink or water-based ink.

The printing pattern for the constant information can be a so-called "draft print" whereby the sections for the image to be printed by the ink-jet recording system (the variable information) are not printed.

As coating agents to be used to form the coating layer there can be mentioned coating agents obtained by dissolving and decomposing in an appropriate solvent one or more binder resins selected from among binder resins that are wettable with respect to water, including proteins such as casein and synthetic proteins, starches such as oxidized starch and esterified starch, celluloses, polyvinyl alcohol and the like; binder resins with excellent dye fixing properties that are used as ink-jet recording ink coloring agents, such as quaternary ammonium salts of cation-modified polyvinyl alcohols or anion-modified polyvinyl alcohols, polyacrylamide, polyalkylacrylamides and the like; as well as highly adhesive binder resins such as acryl resins, polyurethane resins, polyester resins, etc., and dispersing therein one or more layered or sheet-like inorganic pigments or plastic pigments, preferably porous, such as silica, alumina sol, barium sulfate, calcium carbonate, clay or talc, and further containing various additives if necessary.

The coating layer can be a single layer, or it can be formed by two or more combined layers. It can be formed over the entire surface of the printing sheet, or only over parts thereof. When the coating layer is formed overlapping the constant information, on either the entire print or a portion thereof, it is preferred for the formed coating layer to be as highly transparent as possible so that the advertisement information is not hidden. It is also preferred to form the coating layer with a coating agent that does not dissolve the ink, so that the printing ink for the constant information does not run or bleed. When the coating layer is formed only on the sections where the constant information is not printed, the coating layer can be either transparent or non-transparent.

The method of forming the coating layer can employ any of various coating machines such roll coaters, gravure coaters, flexo coaters, blade coaters, rod coaters and air knife coaters, as well as printing units of lithographic printers, relief printers and intaglio printers, while roll coaters, gravure coaters, flexo coaters and printing units of lithographic printers, relief printers and intaglio printers can be also used to partially form the coating layer. When the coating machine of a flexo system provided with an anilox roll and rubber roll can be advantageously used as it allows easy formation of coating layers to a high film thickness, for example, a film thickness of 5–20 μm.

Using a coating agent that allows formation of a smooth coating layer on the printing surface particularly when the printing ink of the constant information has not fully dried, it is advantageous from the standpoint of accomplishing the constant information printing and coating layer formation in a series of steps (in-line system). The coating agents used for such coating layers are preferably types that contain high concentrations of inorganic pigments or plastic pigments to an extent that still maintains the required transparency and coating compatibility. The method of forming the coating layer with an in-line system can be a method using a printer back unit or a method linking a printer and coating machine newly. The coating layer can be also formed using a printer or coating machine in a different step from the constant information printing (off-line system).

The ink-jet recording ink used to print the variable information may be water-based or oil-based.

The print creating method and prints according to the invention offer the following advantageous effects.

According to one aspect of the invention, the following effects are exhibited.

(1) Since personal photographs or daily special products (variable information) imaged by an imaging step can be printed onto a recording sheet on which an advertisement or scenery and characters (constant information) has already been printed, it is possible to create memorial prints depending on the time, place and occasion.

(2) Since the advertisement or scenery and characters (constant information) are already printed and a imaged target image is simply printed on the variable region after being the target imaged, it is possible to shorten the time from imaging a target to output of the print, to create prints more rapidly than by printing with conventional ink-jet recording systems onto an entire recording sheet, and to control the amount of ink-jet recording ink used, so that greater productivity is achieved.

(3) Since printing means based on an ink-jet recording system is used, it Is possible to rapidly create prints with superior designs at low cost.

(4) Since the constant information is already printed on the recording sheet, no memory portion is required to store the constant information and there is no need to compose the constant information and variable information, so that no high performance computer is necessary and the procedure can be carried out using an apparatus with a simpler construction than by conventional techniques.

(5) By printing advertisement information as constant information and printing advertisement information for different sales shops selling the products printed in the constant information as variable information, it is possible to put advertisements for a plurality of sales shops in a chain to be shown together on a single print. Therefore, greater function as an advertising strategy, coordination of prints and reduction of advertisement costs can be achieved.

(6) By printing a plurality of targets as constant information and printing personal information as variable information (for example, if the print is to be created by a hotel, by printing photographs of the hotel, famous tourist sites available to guests or the characters for famous tourist sites as constant information and printing family photographs of hotel guests as variable information), it is possible to provide original memorial prints that can evoke a number of memories from a single print.

According to an aspect of the invention, the following effects are exhibited.

(1) It is possible to create prints bearing clearly printed constant information.

(2) Since the recording sheet can be mass produced at low cost, it is possible to minimize costs for the prints and thus improve productivity.

According to another aspect of the invention, the following effects are exhibited.

(1) There is virtually no running or dulling of the ink-jet recording ink, so that prints can be created bearing clear images that last for long periods.

According to another aspect of the invention, the following effects are exhibited.

(1) When the constant region and variable region overlap, i.e. when the variable information is printed over the constant information, the coating layer lies between the constant information and variable information and hence there is no contact between the printing ink of the constant information and the ink-jet recording ink of the variable information, so that repelling or discoloration cannot easily occur even with combinations of different types of inks such as oil-based printing ink and water-based ink-jet recording ink.

According to another aspect of the invention, the following effect is exhibited.

(1) Since the target can be imaged with only a digital camera without connecting the digital camera to another device, it is possible to photograph from any desired position or angle depending on the state and position of the target.

(2) Since the digital image data can be read into a personal computer and processed with application software such as PhotoShop™ (Adobe Systems), it is possible to compose an image and adjust the brightness and contrast of the composite image and thus output the desired variable information.

(3) Since an ink-jet recording system printer. is used, it is possible to create prints with excellent designs on the spot.

(4) Since the digital camera, personal computer and printer can be detached from each other in a simple manner, the maintenance is facilitated.

According to another aspect of the invention, the following effects are exhibited.

(1) Since the advertisement information and personal information are printed on the same print, it is less likely to be discarded than advertisement leaflets on which only advertisement information is printed, and it can be even used as decoration on the wall of a private room or the like, so that a longer, more reliable advertisement effect is obtained.

(2) For example, for printing of advertisements for supermarkets, department stores, restaurants, inns, hotels or the like as advertisement information and a personal photograph of who is provided with the print as personal information, there is a greater possibility of preserving for long periods and of repeated viewing compared to prints on which only product images are printed, so that a longer, more reliable advertisement effect can be obtained.

(3) It is possible to take the image of customers (guests) at supermarkets, department stores, restaurants, inns, hotels or the like on location and print a photograph of the customer (guest) on a print on which advertisement information is printed, to provide a print with the photograph of the customer (guest) printed in a reliable manner.

According to another aspect of the invention, the following effect is exhibited.

(1) Since the facial photograph of the individual is printed on the print, the print can be used as a deposit passbook or insurance policy certificate for which personal identification is important.

According to another aspect of the invention, the following effect is exhibited.

(1) Since advertisement information (constant information) and personal information (variable information) are printed on the same print, it is less likely to be discarded than advertisement leaflets on which only advertisement information is printed, and it can be even used as decoration on the wall of a private room or the like, so that a longer, more reliable advertisement effect is obtained.

(2) For example, for printing of advertisements for supermarkets, department stores, restaurants, inns, hotels or the like as the constant information and a personal photograph of who is provided with the print as the variable information, there is a greater possibility of preserving for long periods and of repeated viewing compared to prints on which only product images are printed, so that a longer, more reliable advertisement effect can be obtained.

(3) By printing advertisement information as constant information and printing advertisement information for different sales shops selling the products printed in the constant information as variable information, it is possible to put advertisements for a plurality of sales shops in a chain to be shown together on a single print. Therefore, greater function as an advertising strategy, coordination of prints and reduction of advertisement costs can be achieved.

(4) By printing a plurality of targets as constant information and printing personal information as variable information (for example, if the print is to be created by a hotel, by printing photographs of the hotel, famous tourist sites available to guests or characters of famous tourist sites as constant information and printing family photographs of hotel guests as variable information), it is possible to provide original memorial prints that can evoke a number of memories from a single print.

DESCRIPTION OF THE PREFERRED EMBODIMENTS (First Embodiment)

Hereafter, a description is given of the print creating method and print according to a first embodiment of the invention reference to the attached drawings.

In this first embodiment, a case in which the print creating method is employed at a restaurant.

Figure 1:
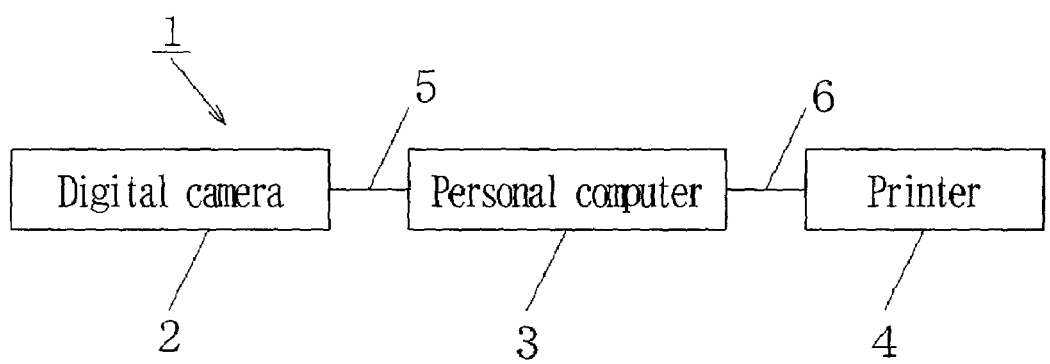
FIG. 1 is a block diagram of an apparatus used for the print creating method of the first embodiment of the invention.

FIG. 1 is a block diagram of an apparatus used for the print creating method of the first embodiment.

In FIG. 1, 1 is the device used for the print creating method of the first embodiment, 2 is a digital camera which serves as imaging means that photoelectrically converts the image of a target obtained through a imaging lens by CCD to produce photoelectric conversion data as an electrical signal, produces digital image data as a digital signal by A/D conversion with an A/D converter, and stores this in a memory, such as a flash memory portion, 3 is a personal computer as conversion means that reads in the digital image data from the memory portion of the digital camera 2, processes it with application software such as PhotoShop™ (Adobe Systems), and converts it into print data that is printable with a printer described hereunder, 4 is an ink-jet recording system printer. that prints the image onto a print described hereunder based on the print data, 5 is a communication cable that connects the digital camera 2 with the personal computer 3, and 6 is a communication cable that connects the personal computer 3 with the printer 4.

When the digital camera 2 has a removable memory portion such as a card flash memory (for example, a Memory Stick™ (Sony Corp.)), the memory portion in which the digital image data is recorded may be removed from the digital camera 2 without connecting the digital camera 2 and the personal computer 3 (without using the communication cable 5), and then inserted into the personal computer 3 to read in the digital image data.

Instead of the digital camera 2 and personal computer 3, a computer with a built in digital camera can be sometimes used. This eliminates the effort of connecting the digital camera 2 with the personal computer 3 by the communication cable 5, and facilitates the operation without requiring separate manipulation of the digital camera 2 and personal computer 3. Therefore, great operation efficiency can be achieved.

Instead of the personal computer 3 and printer 4, a printer can be sometimes used having conversion means to convert the digital image data to print data. This eliminates the need for the personal computer 3 and communication cables 5, 6, and since the digital camera and printer can be simply connected directly with a prescribed communication cable, the number of wiring is reduced while the apparatus as a whole is simplified and space is conserved.

In some cases, the digital camera, conversion means and printer are integrated into a single device. This eliminates the need for the wiring of communication cables 5, 6 and facilitates installation of the entire apparatus.

Infrared rays or the like can be also used instead of communication cables 5, 6, with data transmission being accomplished between each devices with wireless communications. This eliminates the need for the wiring of communication cables 5, 6, and facilitates installation of the entire apparatus.

FIG. 2(a) is a graphical illustration of a recording sheet on which constant information is printed according to the first embodiment, FIG. 2(b) is an expanded cross-sectional view of FIG. 2(a) along line A—A, FIG. 3(a) is a graphical illustration of a print on which variable information is printed with an ink-jet recording system according to the first embodiment, FIG. 3(b) is an expanded cross-sectional view of FIG. 3(a) along line B—B.

Figure 2:
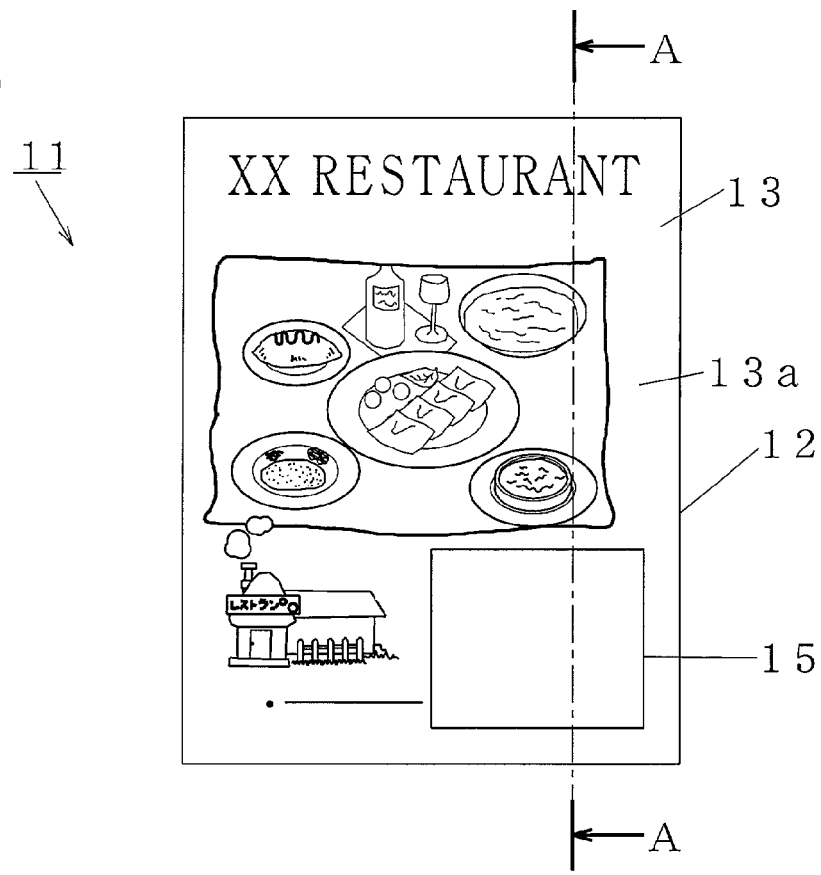
FIG. 2(a) is a graphical illustration of a recording sheet according to the first embodiment of the invention.
FIG. 2(b) is an expanded cross-sectional view of FIG. 2(a) along line A—A.
Figure 2:
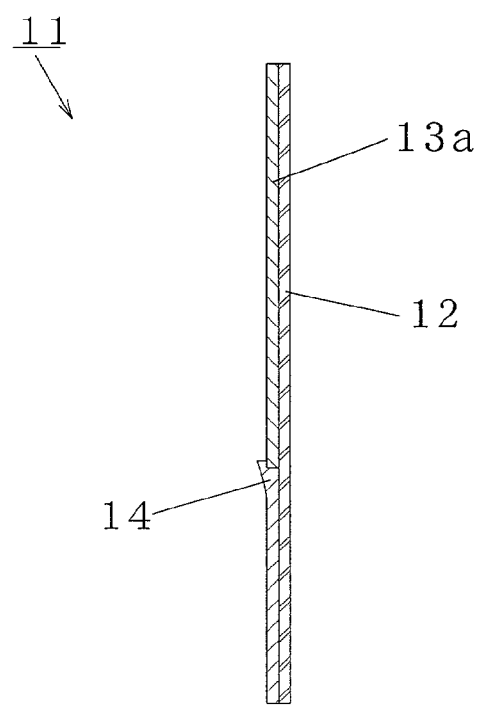
Figure 3:
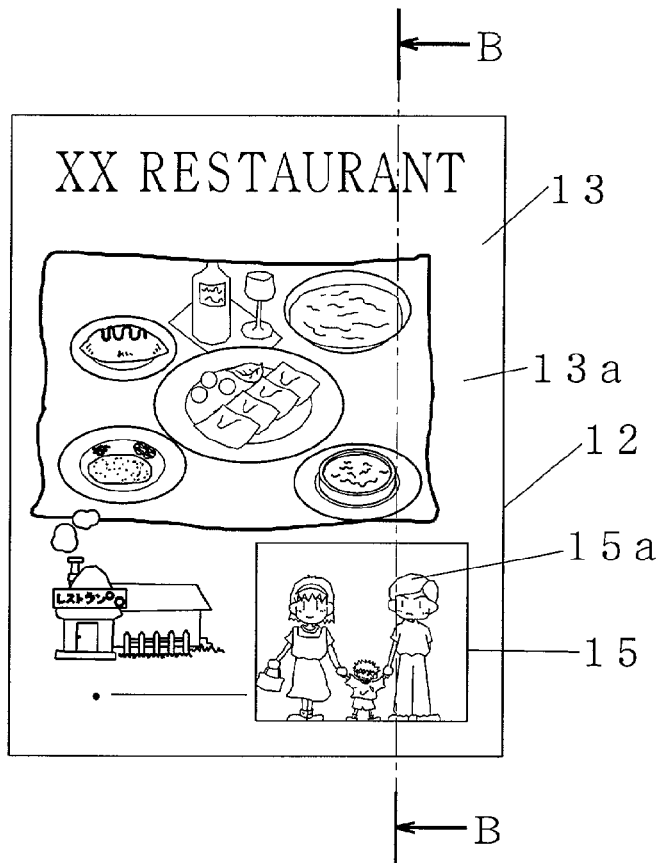
FIG. 3(a) is a graphical illustration of a print according to the first embodiment of the invention.
FIG. 3(b) is an expanded cross-sectional view of FIG. 3(a) along line B—B.
Figure 3:
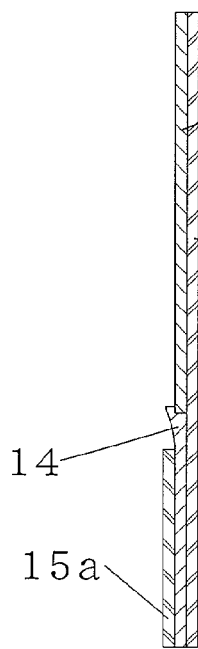

In FIGS. 2 and 3, 11 is a recording sheet on which constant information described hereunder is printed by offset printing or the like according to the first embodiment of the invention, 11' is a print on which variable information is printed with an ink-jet recording system on the recording sheet 11 on which the constant information described hereunder has been offset printed, 12 is a printing sheet such as art paper, coating paper, cast coating paper, glossy paper, high quality paper or medium quality paper, serving as the base for the recording sheet 11, 13 is a constant region on the recording sheet 11, and 13a is constant information comprising printing ink printed by a lithographic printing method such as offset printing, an intaglio printing method such as gravure printing, or a relief printing method. According to the first embodiment, advertisement information such as the restaurant name, food photographs or a map is printed as constant information. Here, 14 is a coating layer on which ink-jet recording ink is printed in the variable region of the printing sheet 12 on which the constant information 13 has been printed, 15 is the variable region of the recording sheet 11, and 15a is the variable information printed by a printer 4 on the coating layer 14 of the variable region 15. According to the first embodiment, the variable information 15a is a printed picture of the guest to whom the print 11' is to be provided or information (personal information) relating to the guest.

The printing sheet 12 can be an ordinary printing sheet that allows satisfactory printing of ink in different printing systems other than those mentioned above, and there are no particular restrictions on its use.

The shape of the variable region 15 can be sometimes triangle, star shaped, cloud shaped, circles, or oval shaped.

Multiple variable regions 15 can be sometimes formed. This will allow printing of a plurality of different variable information, and at a restaurant for example, the daily special menu and guest's picture can be printed separately as variable information.

The size of an area of the variable region 15 is determined according to the location where it is to be used, on the other hand the variable region 15 is set to an area of ⅝ to 1/40, and preferably ½ to 1/30 of the area of the print 11'. If the area of the variable region 15 is larger than ½ of the area of the print 11', the constant information 13a such as advertisement tends to be less conspicuous and the printing time for the variable information 15a tends to be longer; if the area of the variable region 15 is smaller than 1/30 of the area of the print 11', the printing time for the variable information 15a is shortened, but the variable information 15a such as personal photographs tends to be less conspicuous and the individual receiving the print 11' will be more likely to discard the print 11'.

The coating layer 14 can be also formed over the entire surface of the printing sheet 12, instead of only on the variable region 15.

Hereafter, a description is given of a print creating method according to the first embodiment of the invention, employing an apparatus and recording sheet having the construction described above, with reference to the attached drawings.

Figure 4:
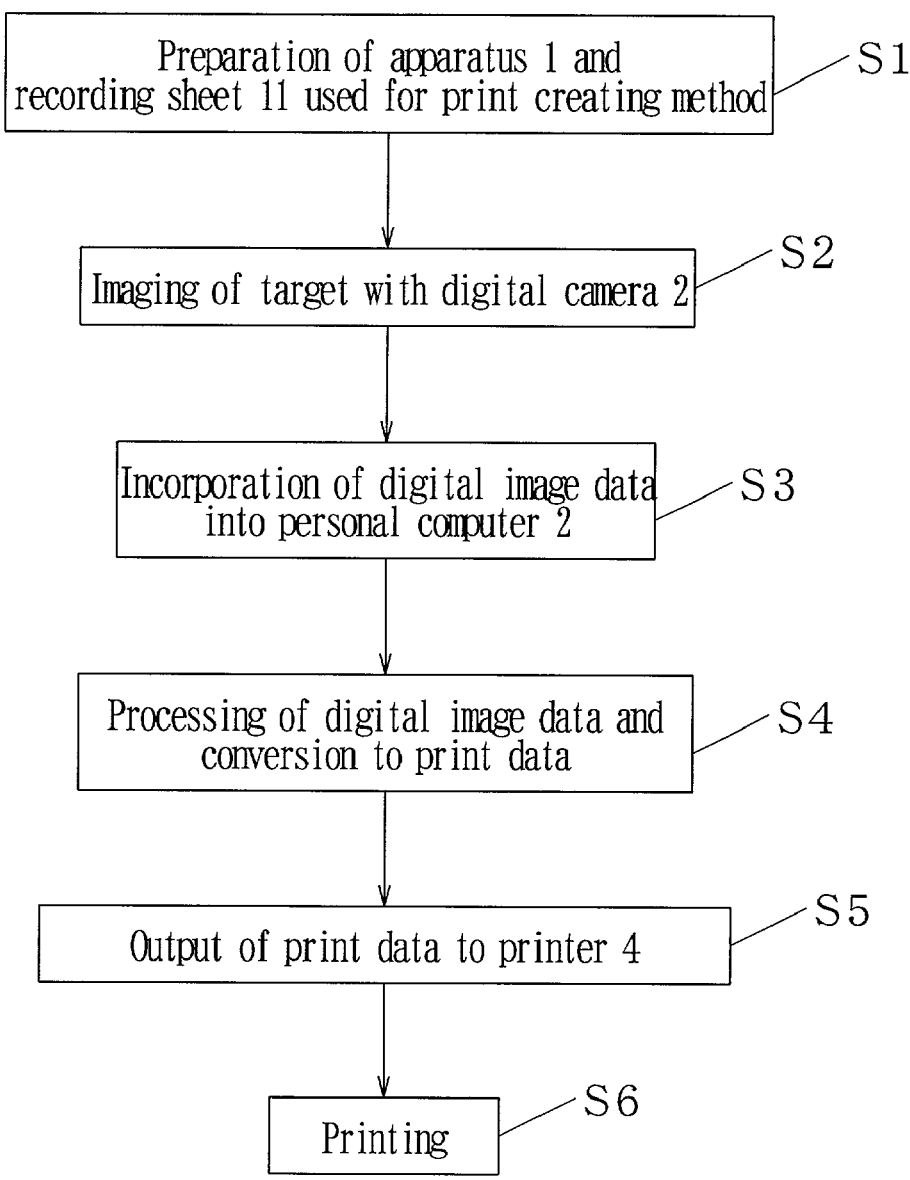
FIG. 4 is a flow chart showing the procedure for the print creating method of the first embodiment of the invention.

FIG. 4 is a flow chart showing the procedure for the print creating method of the first embodiment of the invention.

The apparatus 1 to be used for the print creating method and the recording sheet 11 on which the advertisement information has been printed as constant information 13a in the constant region 13 are provided in the restaurant beforehand (S1).

First, the photograph of a customer (personal information) is taken with a digital camera 2 as the customer arrives, during payment or at another time when the customer is present, as a free service for patrons (S2, imaging step). Next, the digital image data of the customer is incorporated from the digital camera 2 into a personal computer 3 (S3) through a communication cable 5 for adjustment and composition of the brightness, size, contrast of an image and character information is inputted, and the image is converted to print data (S4, conversion step) and is outputted to an ink-jet recording system printer 4 through a communication cable 6 (S5). At the printer 4, the photograph of the customer (personal information) is printed as variable information 15a in the variable region 15 of the recording sheet 11 on which the advertisement information has been printed as constant information 13a, based on the print data (S6, printing step), and a print 11' is created as a composite of the advertisement information and the customer's photograph (personal information). The created print 11' is provided to the customer on the spot.

The print creating method and prints according to the first embodiment of the invention with the construction described above provide the following effects.

(1) Since the zone for printing by the printer 4 (variable region 15) is limited, it is possible to create the print 11' more rapidly than by printing on the entire sheet, thus allowing the customer to be provided with the print immediately after imaging.

(2) The customer arriving at the restaurant can be imaged on the spot and the photograph of the customer is printed on a print containing printed advertisement information, it is possible to provide a print 11' with the photograph of the customer himself as a reliable print.

(3) Since it is possible to accomplish imaging of targets with only a digital camera 2 without connecting the digital camera 2 to other devices, it is possible to photograph from any desired position or angle depending on the state and position of the target.

(4) Since the digital image data can be read into a personal computer 3 and the digital image data processed with application software such as PhotoShop™ (Adobe Systems), it is possible to compose an image and adjust the brightness and contrast of the composite image and thus output the desired variable information 15a.

(5) Since an ink-jet recording system printer 4 is used, it is possible to create a print 11 with an excellent design.

(6) Because a coating layer 14 is formed, there is virtually no running or dulling of the ink-jet recording ink, so that a print 11' can be created bearing a clear image.

(7) When the constant region 13 and variable region 15 overlap, i.e. when the variable information 15a is printed over the constant information 13a, the coating layer lies between the constant information 13a and variable information 15a and hence there is no contact between the printing ink of the constant information 13a and the ink-jet recording ink of the variable information 15a, so that repelling or discoloration cannot easily occur even with combinations of different types of inks such as oil-based printing ink and water-based ink-jet recording ink.

(8) Since the coating layer 14 is formed only in the variable region 15, it is possible to reduce the amount of coating agent used to form the coating layer, thus allowing production at lower cost.

(9) Since the advertisement information and the photograph of the customer (personal information) are printed on the same print, it is less likely to be discarded than an advertisement on which only advertisement information is printed, so that it is retained for a longer time and may be even used as decoration on the wall of a private room or the like, so that a longer, more reliable advertisement effect is obtained.

(10) An excellent customer-attracting effect is provided, since the service is carried out as a memorial of the visit to the restaurant.

In the first embodiment, the print creating method was explained as an application for a restaurant, but it may be also applied in the same manner hotels, wedding halls, tourist sites, department stores, supermarkets, automobile dealers, sales promotion exhibitions, etc. When applied at hotels or wedding halls the service information and building images are printed as the constant information, when used at tourist site the tourist location images are printed as the constant information, and when used at department stores, supermarkets, automobile dealers or sales promotion exhibitions, the product images are used as the constant information.

Also, while only a restaurant advertisement was printed as the advertisement information for the first embodiment, advertisement for other sales entities is sometimes printed as advertisement information in addition to the restaurant advertisement.

Furthermore, while personal information was printed as the variable information for the first embodiment, when carried out at department stores or supermarkets, the variable information that is printed may consist of images of products offered as daily specials. This eliminates the need to print onto an entire printing sheet each day, and since only the variable information need be printed, it is possible to create advertisement leaflets at lower cost and thereby improve productivity.

(Second Embodiment)

Hereafter, a description is given of the print creating method and print according to a second embodiment of the invention employing the same apparatus as the first embodiment with reference to FIG. 1 and FIGS. 5(a) and (b), where the method is carried out at the entrance of an amusement park and the created print is used as a "free passport" for the amusement park (received upon payment of the entrance fee and allowing unlimited free use of designated facilities in the amusement park).

The different aspects of the second embodiment from the first embodiment are that the recording sheet used is different and that the location where the print creating method is carried out is different.

FIG. 5(a) is a graphic illustration of a recording sheet according to the second embodiment, and FIG. 5(b) is a graphic illustration of a print according to the second embodiment.

Figure 5:
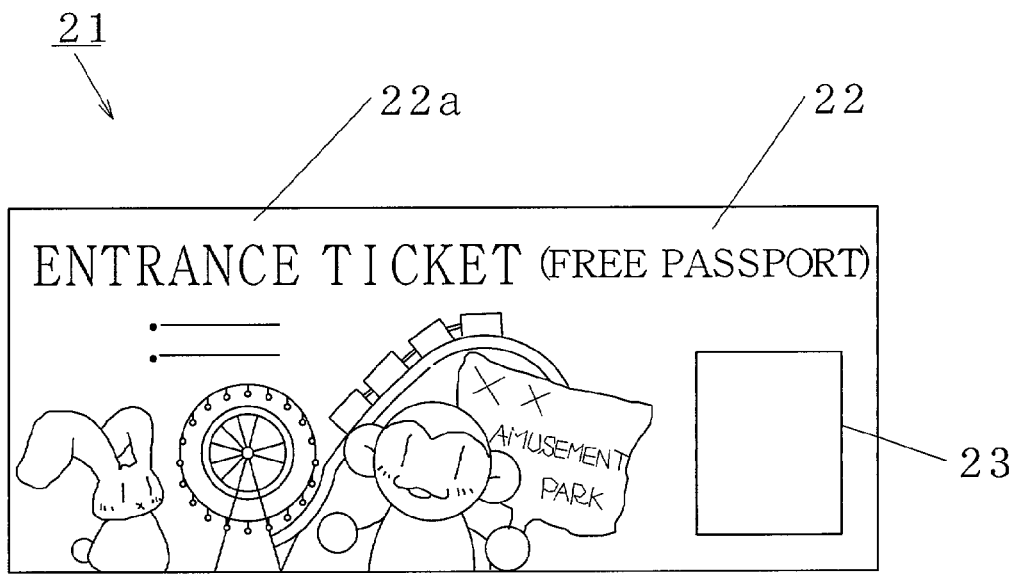
FIG. 5(a) is a graphic illustration of a recording sheet according to the second embodiment of the invention.
FIG. 5(b) is a graphic illustration of a print according to the second embodiment of the invention.
Figure 5:
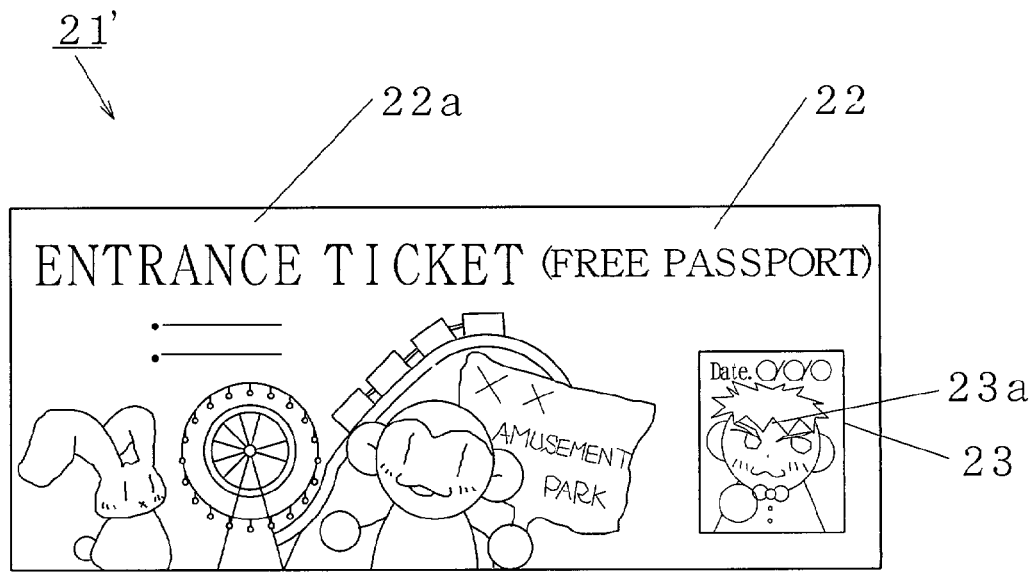

In FIG. 5, 21 is the recording sheet according to the second embodiment, 21' is a print on which variable information described hereunder is printed on the recording sheet 21, 22 is a constant region on the recording sheet 21, 22a is constant information such as the amusement park name, the names of the facilities which can be used freely, images of the game facilities or characters, etc. which are printed in the constant region 22, 23 is a variable region on the recording sheet 21 on which a coating layer (not shown) is formed, and 23a is variable information such as the photograph of a park guest, printed in the variable region 23.

A print creating method according to the second embodiment of the invention employing the apparatus and the print with the aforementioned construction is now explained with reference to the attached drawings.

First, a facial photograph of the park entrant (personal information) is taken with a digital camera 2 at the park entrance, at the time when the print 21 (free passport) is issued. Next, the digital image data of the facial photograph is incorporated from the digital camera 2 into a personal computer 3, for adjustment and composition of the brightness, size, contrast of an image, and the image is converted to print data and is outputted to an ink-jet recording system printer 4. At the printer 4, the facial photograph of the park entrant (personal information) is printed as variable information 23a on the recording sheet 21 on which the constant information 22a has been printed, based on the print data, and a print 21' is created as a composite of the main information such as facility names and amusement park names, and the customer's facial photograph (personal photograph). The created print 21' is provided to the park entrant on the spot.

The print creating method and prints according to the second embodiment of the invention with the construction described above provide the following effects.

(1) Since the main information such as facility names and the amusement park name (constant information 22a) is printed beforehand and only the facial photograph (variable information 23a) is printed when the park entrant purchases the free passport (print 21'), it is possible to provide the free passport (print 21') without causing a delay for the park entrant.

(2) Since the facial photograph (personal information) of the park guest is printed on the free passport (print 21'), it is possible for those in charge of each facility to identify the bearer by the photograph, so that the possibility of abuse of the free passport (for example, use of the facility using the free passport of another person) can be minimized.

(3) Since a facial photograph (variable information 23a) is printed on the free passport (print 21'), the park entrant is more likely to preserve the free passport even upon returning home and show it to others, so that the advertisement effect for the amusement park is further increased.

Incidentally, while the second embodiment was explained as an application where the print 21' is used as a free passport, the print can be also provided for a deposit bank book with identifying photograph to be used at a bank, post office or the like, for a transportation season pass, for a company identification card, for a passport, or the like. This can deter abuse of deposit bank books, for example.

What is claimed is:

1. A print creating method for prints on which variable information and constant information is printed, the print creating method comprising:
   a. an imaging step in which a target is imaged and digital image data of said target is created,
   b. a conversion step in which said digital image data is converted to print-processable print data, and
   c. a printing step in which said print data is printed with an ink-jet recording system as said variable information on a variable region of a recording sheet, said recording sheet comprising a constant region in which only prescribed constant information is printed beforehand and a variable region comprising a coating layer upon which only said variable information is able to be printed.

2. A print creating method according to claim 1, wherein the constant information of said recording sheet is printed by any one of a lithographic printing method, an intaglio printing method or a relief printing method.

3. A print creating method according to claim 1, wherein said coating layer is formed after printing said constant information on said recording sheet.

4. A print creating method according to any one of claims 1, 2 and 3, wherein:
   a. in said imaging step, the imaging means that images said target to create said digital image data of said target is a digital camera,
   b. in said conversion step, the conversion means that converts said digital image data to said print-processable print data is a personal computer, and
   c. in said printing step, the printing means that prints said print data is an ink-jet printer.

5. A print creating method according to any one of claims 1, 2 and 3, wherein said constant information is advertisement information, and said variable information is personal information of a person who is to receive said print.

6. A print creating method according to any one of claims 1, 2 and 3, wherein said variable information is a photograph of a person who is to receive said print.

7. A print comprising:
   a. a printing sheet,
   b. constant information printed on said printing sheet,
   c. a coating layer which is coated on said printing sheet in a defined pattern that avoids areas of said printing sheet upon which constant information is printed, and
   d. variable information printed on said coating layer by a print creating method according to any one of claims 1, 2 and 3.

8. A print creating method according to claim 1, wherein said variable information is obtained from the target which is disposed at the same location as said ink-jet recording system.

9. A print creating method for prints on which variable information is printed in a variable region of a recording sheet and constant information is printed in a constant region of said recording sheet, the print creating method comprising:
   imaging a target to create digital image data of said target,
   converting said digital image data to print data, and
   printing said print data with an ink-jet recording system as said variable information on said variable region, wherein said constant information is printed on said recording sheet prior to the processing and printing of said variable information, said recording sheet comprising a constant region in which only prescribed constant information is printed beforehand and a variable region comprising a coating layer upon which only said variable information is able to be printed.

10. A print creating method according to claim 9, wherein said constant information is printed by at least one of a lithographic printing method, an intaglio printing method or a relief printing method.

11. A print creating method according to claim 9, wherein said coating layer is formed after printing said constant information on said recording sheet.

12. A print creating method according to any one of claims 9, 10 and 11, wherein:
   said target is imaged by a digital camera to create said digital image data of said target;
   said digital image data is converted by a computer into said print data; and
   said printing data is printed in said variable region by an ink-jet printer.

13. A print creating method according to any one of claims 9, 10 and 11, wherein said constant information is advertisement information, and said variable information is personal information of a person who receives said print.

14. A print creating method according to any one of claims 9, 10 and 11, wherein said variable information is a photograph of a person who receives said print.

15. A print comprising:
   a printing sheet;
   constant information printed in a constant region of said printing sheet;
   a coating layer that is coated on said printing sheet in a defined pattern that avoids areas of said printing sheet upon which constant information is printed, said coating layer defining a variable region; and
   variable information printed on said coating layer of said printing sheet,
   wherein said constant information is printed only said constant region prior to printing said variable information only in said variable region by an ink-jet printer.

* * * * *